(12) United States Patent
Zangi

(10) Patent No.: US 8,451,791 B2
(45) Date of Patent: *May 28, 2013

(54) ALLOCATION OF UPLINK REFERENCE SIGNALS IN A MOBILE COMMUNICATION SYSTEM

(75) Inventor: Kambiz Zangi, Chapel Hill, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/421,403

(22) Filed: Mar. 15, 2012

(65) Prior Publication Data

US 2012/0170542 A1   Jul. 5, 2012

Related U.S. Application Data

(63) Continuation of application No. 12/346,333, filed on Dec. 30, 2008, now Pat. No. 8,199,708.

(51) Int. Cl.
*H04J 11/00* (2006.01)
*H04W 4/00* (2009.01)

(52) U.S. Cl.
USPC ........... 370/329; 370/208; 370/209; 370/210; 370/328; 370/334; 370/338

(58) Field of Classification Search
None
See application file for complete search history.

(56) References Cited

U.S. PATENT DOCUMENTS

2008/0037464 A1 * 2/2008 Lim et al. ............ 370/329
2010/0165930 A1   7/2010 Zangi

* cited by examiner

*Primary Examiner* — Faruk Hamza
*Assistant Examiner* — Diane Lo

(57) ABSTRACT

A mobile communication system network node (NN) that serves user equipments (UEs) has fewer orthogonal reference signals (RSs) than a maximum number of UE antenna ports (APs) that can be served by the NN. A channel quality of a channel between the AP and the network node is ascertained for each of the APs. Whenever a number of APs of UEs served by the NN exceeds the number of RSs, all RSs are allocated to a subset of all of the APs by means of an allocation process such that: each RS is allocated to only one of the APs; each AP has no more than one RS allocated to it; and allocation decisions are a function of the channel qualities of the respective APs such that the higher the channel quality, the higher priority the corresponding AP is given as a candidate for receiving an RS allocation.

20 Claims, 10 Drawing Sheets

ALLOCATION OF UPLINK REFERENCE SIGNALS IN A MOBILE COMMUNICATION SYSTEM

CROSS-REFERENCE TO RELATED APPLICATIONS

This application is a continuation of U.S. patent application Ser. No. 12/346,333 filed Dec. 30, 2008 now U.S. Pat. No. 8,199,708, the disclosure of which is fully incorporated herein by reference.

FIELD OF THE INVENTION

The present invention relates to transmission of reference signals in an Orthogonal Frequency Division Multiplex (OFDM)-based system, and more particularly to transmission of demodulation reference signals in an OFDM-based communication system.

BACKGROUND OF THE INVENTION

In the Long-Term Evolution (LTE) mobile communication system defined by the 3$^{rd}$ Generation Partnership Project (3GPP), uplink radio transmissions utilize Discrete Fourier Transform (DFT)-spread-OFDM (DFTS-OFDM) techniques. FIG. 1a is a block diagram illustrating how DFTS-OFDM works. Blocks of M modulation symbols 101 are first applied to a size M DFT 103. The output of the DFT 103 is then supplied to a frequency mapper 105, which maps the DFT output to selective consecutive inputs of a size N Inverse DFT 107 that can, for example, be implemented by means of Inverse Fast Fourier Transform (IFFT) processing. By adjusting the block size M, the instantaneous bandwidth of the transmitted signal can be varied. Similarly, by adjusting (e.g., shifting) the set of IFFT inputs to which the DFT output block of size M is mapped, the frequency-domain position of the transmitted signal can be adjusted. DFTS-OFDM can be thought of as an OFDM transmission (an IFFT) preceded by a DFT-based pre-coding. Thus, as with OFDM, the spectrum of a DFTS-OFDM signal can be seen as consisting of a number of subcarriers.

In some other mobile communication standards, pure OFDM is used instead of DFTS-OFDM. FIG. 1b is a block diagram illustrating how pure OFDM works. Blocks of M modulation symbols 111 are applied directly to a frequency mapper 113, which maps the M modulation symbols to selective consecutive inputs of a size N Inverse DFT 115 that can, for example, be implemented by means of Inverse IFFT processing. By adjusting the block size M, the instantaneous bandwidth of the transmitted signal can be varied. Similarly, by adjusting (e.g., shifting) the set of IFFT inputs to which the DFT output block of size M is mapped, the frequency-domain position of the transmitted signal can be adjusted. As mentioned above, the spectrum of an OFDM signal can be seen as consisting of a number of subcarriers.

SUMMARY OF THE INVENTION

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses for operating a network node that serves a plurality of user equipments in a mobile communication system. Such operation involves providing the network node with a number, $N_{RS}$, of orthogonal reference signals, wherein $N_{RS}$ is less than a maximum number, $N_{MAX\_AP}$, of user equipment antenna ports that can be served by the network node. For each of the antenna ports, a channel quality of a channel between the antenna port and the network node is ascertained. Whenever a number of antenna ports of user equipments being served by the network node exceeds the number, $N_{RS}$, of orthogonal reference signals, all $N_{RS}$ orthogonal reference signals are allocated to a subset of all of the antenna ports by means of an allocation process such that: each orthogonal reference signal is allocated to only one of the antenna ports; each antenna port has no more than one orthogonal reference signal allocated to it; and allocation decisions made by the allocation process are a function of the channel qualities of the respective antenna ports such that the higher the channel quality, the higher priority the corresponding antenna port is given as a candidate for receiving an orthogonal reference signal allocation.

In some embodiments, allocating all $N_{RS}$ orthogonal reference signals to the subset of all of the antenna ports by means of the allocation process is performed such that each of the user equipments has at least one antenna port to which an orthogonal reference signal is allocated.

In some embodiments, allocating all $N_{RS}$ orthogonal reference signals to antenna ports by means of an allocation process includes, in a round-robin order, allocating one orthogonal reference signal in turn to each of the user equipments still having an antenna port to which no orthogonal reference signal has yet been assigned, wherein the round-robin order begins with a user equipment associated with a best ascertained channel quality and continues with user equipments associated with ascertained channel qualities in descending order.

In some embodiments, each of the user equipments has a same number of antenna ports.

In some embodiments, the network node is an eNodeB.

In some embodiments, the network node is a coordination center of a distributed antenna system cell in the mobile communication system.

In some embodiments, each of the antenna ports corresponds to a single antenna in one of the user equipments.

In some embodiments, each of the user equipments transmits an information stream through no more than one of the user equipment's antennas.

In another aspect of embodiments consistent with the invention, a control signal is communicated to a user equipment, wherein the control signal conveys reference signal allocation information.

In some embodiments, the reference signal allocation information includes an indicator that uniquely identifies one or more reference signals to be used by the user equipment, and an indicator that associates each of the one or more identified reference signals with a corresponding one of a number antenna ports of the user equipment.

BRIEF DESCRIPTION OF THE DRAWINGS

The objects and advantages of the invention will be understood by reading the following detailed description in conjunction with the drawings in which.

DETAILED DESCRIPTION

Figure 1A:
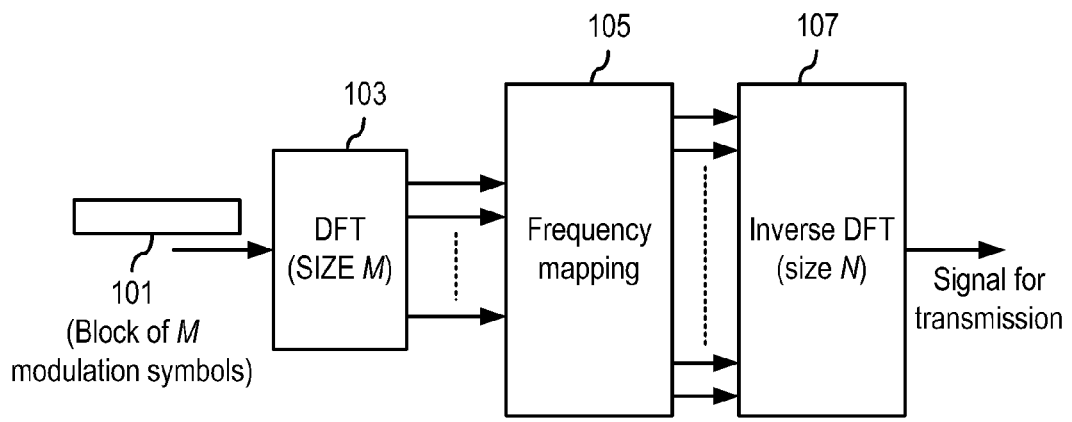
FIGS. 1a and 1b are block diagrams illustrating how DFTS-OFDM and pure OFDM, respectively, work.
Figure 1B:
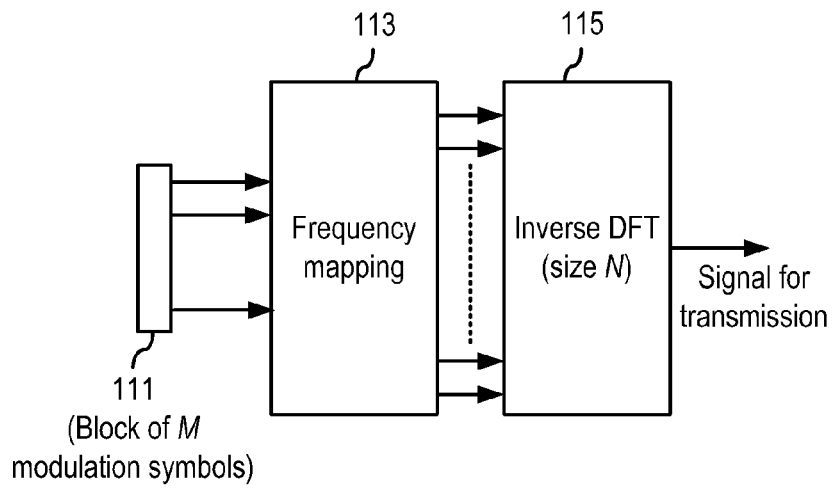

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action, or alternatively as "means for" performing a described action or function.

FIG. 2 is a diagram illustrating a basic subframe structure of an LTE uplink radio interface. It will be appreciated that aspects of the LTE system are presented here to facilitate an understanding of various aspects of the invention. However, characteristics of the LTE system that make it a suitable environment for practicing the invention are also present in other systems (e.g., other OFDM communication systems). Accordingly, the invention is not limited to application only in an LTE system, but rather is suitable for use in other communication systems as well.

Figure 2A:
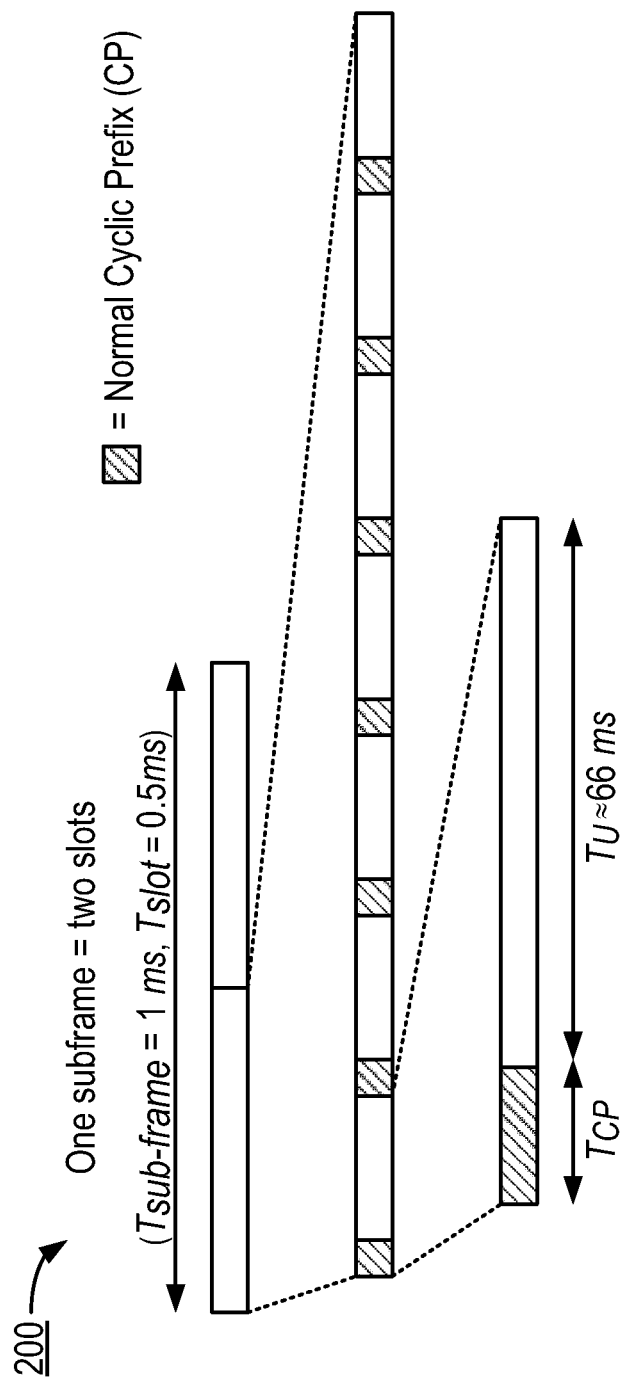
FIG. 2a illustrates an exemplary subframe for use in the uplink radio interface of an LTE-type communication system.

The LTE uplink radio interface includes subframes, an exemplary one of which is depicted in FIG. 2a. Each subframe 200 has a time duration of 1 ms, and consists of two equally-sized slots of duration 0.5 ms. As an example, each slot can consist of seven OFDM symbols. Within one OFDM symbol, data (e.g., a number, M, of modulation symbols) are transmitted in parallel on a large number of narrowband subcarriers. As is known in the art, each OFDM symbol includes a cyclic prefix whose purpose is to make the OFDM signal insensitive to time dispersion on the radio channel.

Figure 2B:
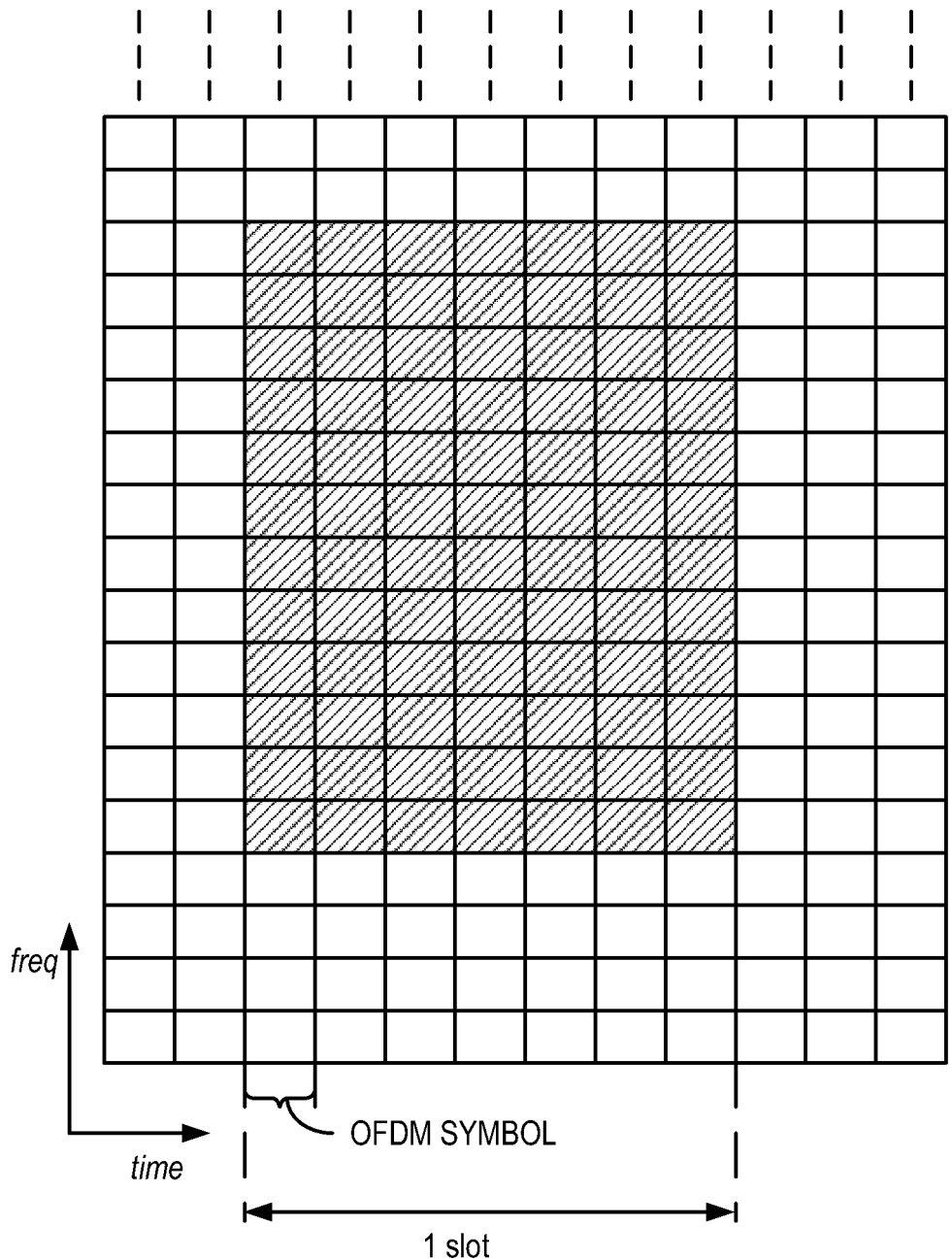
FIG. 2b is an exemplary time/frequency grid illustrating uplink transmission in an LTE-type communication system.

The uplink transmission can be described as a time/frequency grid as illustrated in FIG. 2b, in which each resource element or modulation symbol corresponds to one subcarrier during one OFDM symbol interval. For an LTE system, the spacing between neighboring subcarriers is 15 kHz, and the total number of subcarriers can be as large as 1200. As also illustrated in FIG. 2b, the subcarriers are grouped into resource blocks, wherein each resource block consists of 12 subcarriers during one 0.5 ms slot. With seven OFDM symbols per slot, there is thus a total of 12×7=84 resource elements in a resource block. One such resource block is illustrated as the shaded area in FIG. 2b.

Figure 3:
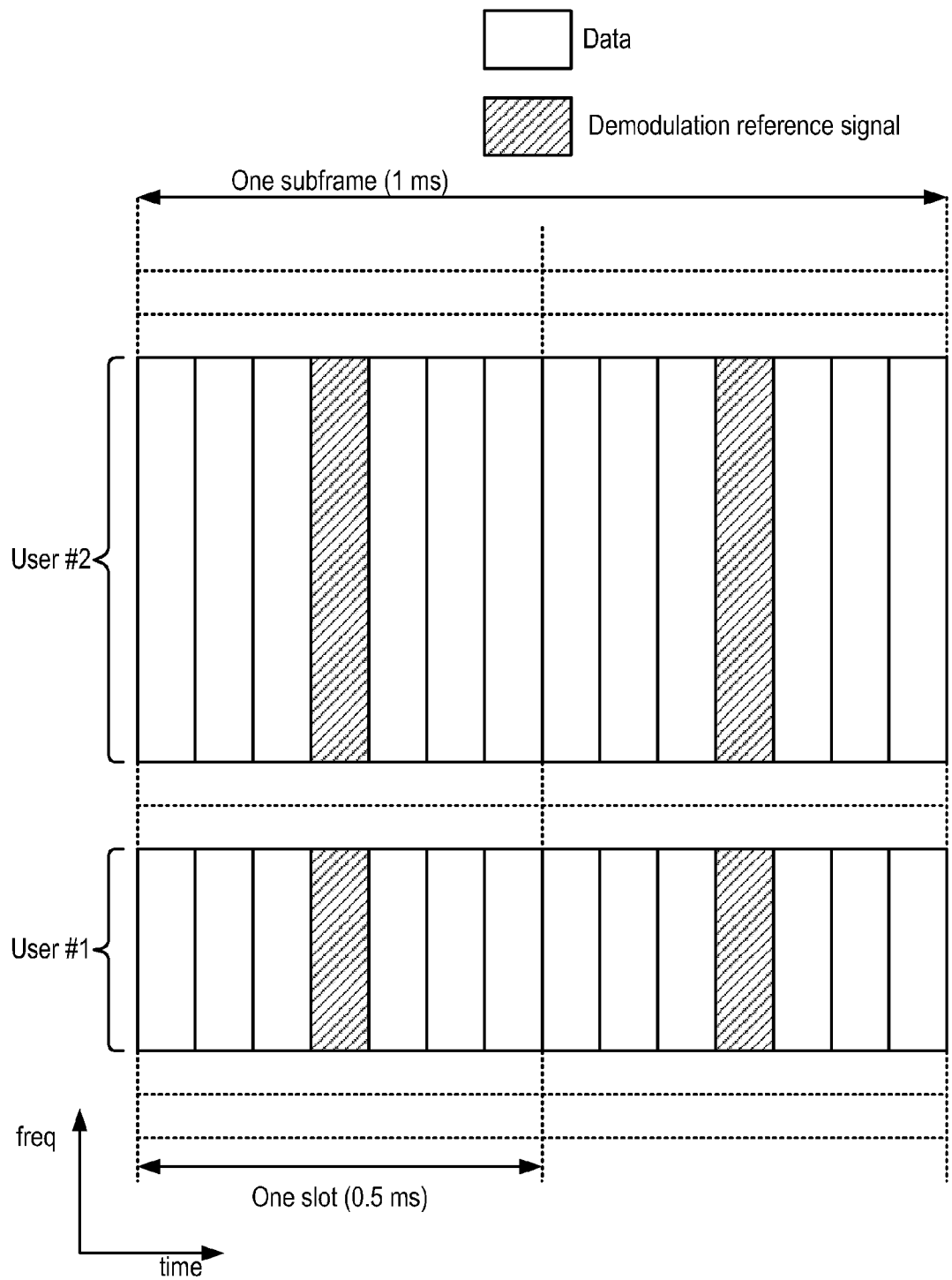
FIG. 3 is a time/frequency diagram illustrating two exemplary slots with "demodulation reference signals" being transmitted in the fourth long block of each slot and with a bandwidth equal to the bandwidth of the data transmission.

In the LTE radio-access technology, as well as in others, the uplink radio channel of a mobile-terminal-to-network link can be estimated by means of known reference signals that are transmitted by the mobile terminal within specific DFTS-OFDM blocks. The radio channel over a bandwidth equal to the instantaneous bandwidth of the uplink data transmission can be estimated by means of the transmission of so-called "demodulation reference signals", transmitted within the fourth OFDM symbol of each slot. Of note is the fact that each demodulation reference signal has a bandwidth equal to the bandwidth of the data transmission. The situation for two exemplary OFDM slots is illustrated in FIG. 3. These reference signals can, for example, be used for channel estimation for coherent detection of the uplink data transmission from the mobile terminal.

The demodulation reference signals can, in the frequency domain, be seen as consisting of a number of subcarriers. Generation of the demodulation reference signals typically is by means of "normal" OFDM processing (i.e., no DFT precoding is used).

Generally speaking, cellular systems suffer from co-channel interference, whereby simultaneous transmissions use the same physical resources and thus generate mutual interference. This co-channel interference reduces the signal quality (e.g., measurable as a signal to interference plus noise ratio—"SINR") and in turn reduces the system capacity. Systems having a dense deployment of nodes are especially interference-limited, meaning that their performance is limited by co-channel interference.

Figure 4:
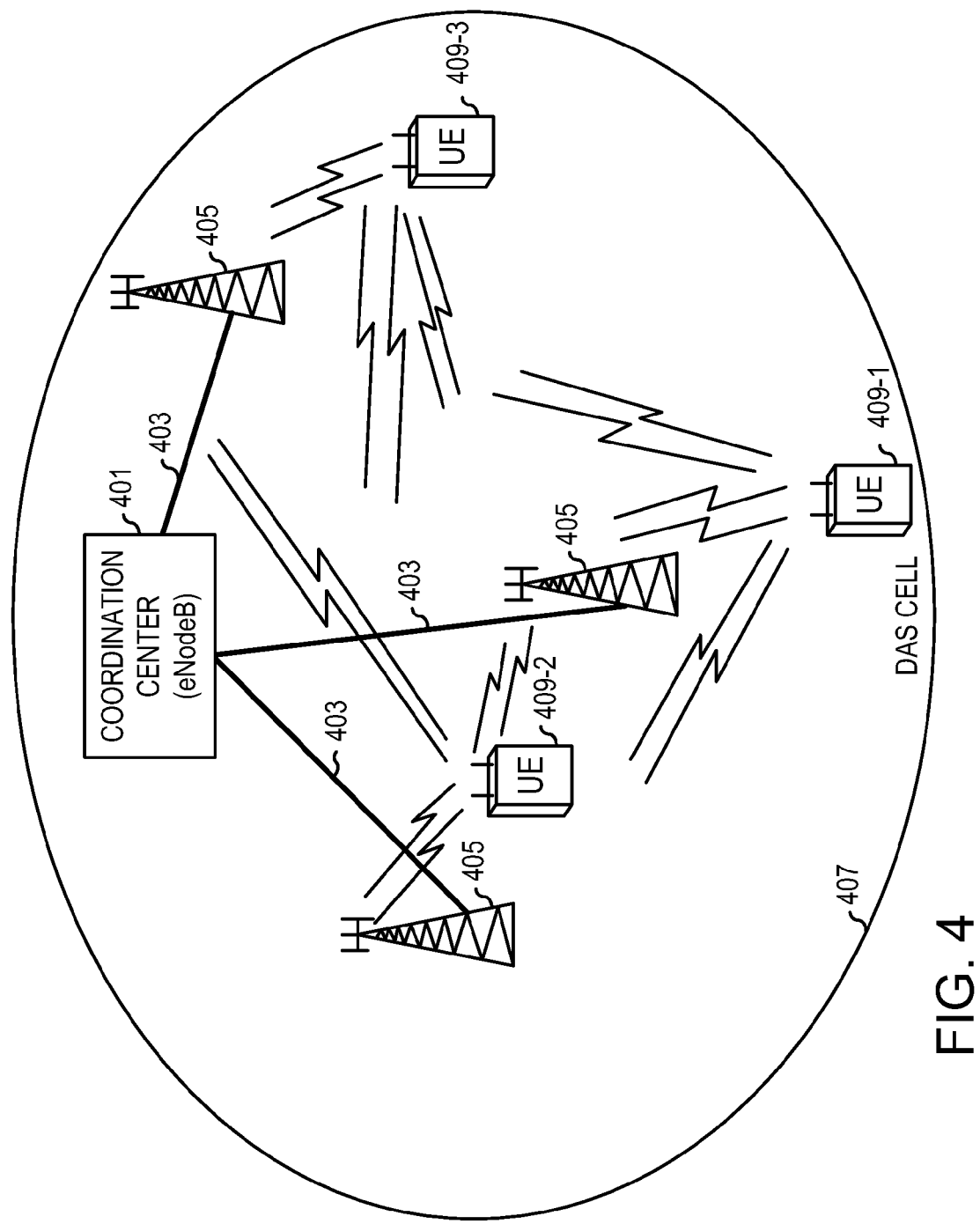
FIG. 4 is an illustration of a mobile communication system arrangement in which CMPRX is utilized.

A technique called "coordinated multipoint reception" (CMPRX) is being considered for use in systems such as LTE-Advanced because it is a promising technology for improving the system-level performance in the uplink direction (i.e., from a user equipment—"UE"—to a base station or eNodeB) in interference-limited scenarios. The basic idea of CMPRX is to allow a baseband receiver to use antennas situated at multiple sites to demodulate the symbols transmitted by various UEs on the uplink. One implementation of CMPRX, illustrated by the arrangement depicted in FIG. 4, comprises an eNodeB 401 that is connected (e.g., by means of fiber cable 403) to multiple antennas 405 located at different sites. This eNodeB 401 acts as a "coordination center" 401 having a geographic coverage area referred to as a Distributed Antenna System (DAS) cell 407. A number of UEs can be present and served by the coordination center 403. In the illustrated embodiment, there are three of them (UE 409-1, UE 409-1, and UE 409-3), although it will be appreciated that at any given time there could be more or fewer UEs. In this arrangement, the signals transmitted by each of the UEs 409-1, 409-2, 409-3 in the DAS cell 407 are demodulated together using all of the network antennas 405 within the coverage area of the DAS cell 407. It will be appreciated by those skilled in the art that the present invention will be equally applicable to scenarios in which all the receive antennas (i.e., antennas on the network) belonging to one DAS cell are located at one site. In such scenarios, the DAS cell becomes an ordinary cell in which multiple UEs are allowed to transmit simultaneously on the same set of subcarriers.

Two particularly attractive baseband techniques for demodulating the signals received from the UEs 409-1, 409-2, 409-3 in each DAS cell 407 are: successive interference cancellation (SIC) and interference rejection combining (IRC). Each of these baseband receiver techniques requires that the channel between each mobile and each receive antenna be estimated by the uplink receiver. It has been shown that the quality of these channel estimates greatly influences the performance of SIC as well as IRC.

As mentioned earlier with reference to FIG. 3, uplink channels are typically estimated by the uplink receiver from demodulation reference signals (RSs) that are transmitted from each UE antenna. (Modern UEs are often designed having two or more transmit antennas to improve transmitter and receiver performance.) In LTE systems, one OFDM symbol out of each 0.5 ms slot is devoted to the transmission of an RS by all UEs. Hence, when estimating any given uplink channel at the coordination center 401, the other reference signals act as interference, which degrades the accuracy of the channel estimate. As the interference among the different RSs increases the channel estimation quality decreases. To mitigate this effect, the reference signals used by all of the UEs being served by one DAS cell will ideally be orthogonal with respect to one another.

For example, consider a system in which each UE is equipped with $N_{tx}$ transmit antenna ports. The term "antenna port" is used here instead of the term "transmit antenna" in recognition of the fact that several physical transmitting antennas can be configured such that they appear as one antenna from the perspective of the receiver. The term "antenna port", then, is intended to cover all possible embodiments, including a single physical antenna as well as two or more antennas configured to act in concert so as to be equivalent to a single transmitting antenna from the point of view of a receiver. Note that in the LTE standard, every downlink transmission is always expressed as being carried out from a set of antenna ports.

Assume that a number, $N_{UE}$, of UEs can be simultaneously served within one DAS cell. Thus, ideally, it would be desirable to have ($N_{tx}*N_{UE}$) orthogonal reference signals available for use in each DAS cell.

To take a numerical example, consider a DAS cell having 7 antenna sites (which corresponds to 21 sectors). Furthermore, assume that each sector will serve a maximum of one UE. This means that the maximum number of UEs that can be simultaneously served by this DAS cell is equal to $N_{UE}$=21. If each of the UEs has $N_{tx}$=2 transmit antenna ports, each DAS cell would require $N_{tx}*N_{UE}$=2*21=42 orthogonal reference signals. However, current system designs often allocate fewer orthogonal reference signals per DAS cell. For example, the present LTE Release 8 standard supports having 8 orthogonal reference signals within each DAS cell.

Increasing the number of orthogonal reference signals inherently requires devoting more uplink resources to the transmission of uplink reference signals, and this in turn reduces the amount of uplink resources left for transmission of data. This suggests that, ideally, one would like to have as few orthogonal reference signals on the uplink as possible.

In present systems, the number of uplink orthogonal reference signals needed in a DAS cell increases by $N_{tx}$ for every additional UE that is served by the DAS cell. Hence, with $N_{UE}$ UEs being served by a coordination center, there will be a need to set aside enough uplink resources to support $N_{tx}*N_{UE}$ orthogonal reference signals. As $N_{UE}$ and $N_{tx}$ become large, a substantial portion of uplink resources could be taken away by the reference signals alone, making these resources unavailable for transmitting uplink data.

It is therefore desirable to provide methods and apparatuses that allow each DAS cell to operate with fewer than $N_{tx}*N_{UE}$ orthogonal reference signals while minimally degrading the performance experienced by each UE within the coordination center's coverage area.

In an aspect of embodiments consistent with the invention, a network node, such as a coordination center of a DAS cell, assigns all of a number, $N_{RS}$, of orthogonal reference signals to only a subset of all antenna ports of user equipments being served by the network node. An implication of this is that, given the presence of a number, $N_{TX}$, of transmitter antenna ports associated with UEs in the DAS cell, fewer than $N_{TX}$ transmitted streams will be assigned to the UEs. Unless otherwise provided for, the coordination center should force each UE to transmit each of its streams from a different one of its available transmit antenna ports.

When $N_{RS}$ is less than $N_{TX}$, (i.e., the coordination center has fewer assignable orthogonal reference signals than there are transmit antenna ports in the DAS cell), an aspect of embodiments consistent with the invention enables the coordination center to determine the number of orthogonal reference signals that will be assigned to each mobile such that the overall performance is degraded as little as possible.

In another aspect of embodiments consistent with the invention, more orthogonal reference signals (and hence, streams) are assigned to transmit antenna ports having better channel quality than those transmit antenna ports having poorer channel quality. This assignment can be signaled using the downlink control channel to the UEs. This assignment strategy is believed to provide advantages because users with poor channel quality do not benefit much from transmitting multiple streams, and therefore do not experience a substantial degradation in service due to not being able to transmit as many streams as their number of antenna ports would otherwise permit. By contrast, users with good channel quality do benefit greatly by having assigned to them a sufficient number of orthogonal reference signals to enable them to make fuller user of their available transmit antenna ports.

These and other aspects of embodiments consistent with the invention will now be described in greater detail.

Figure 5:
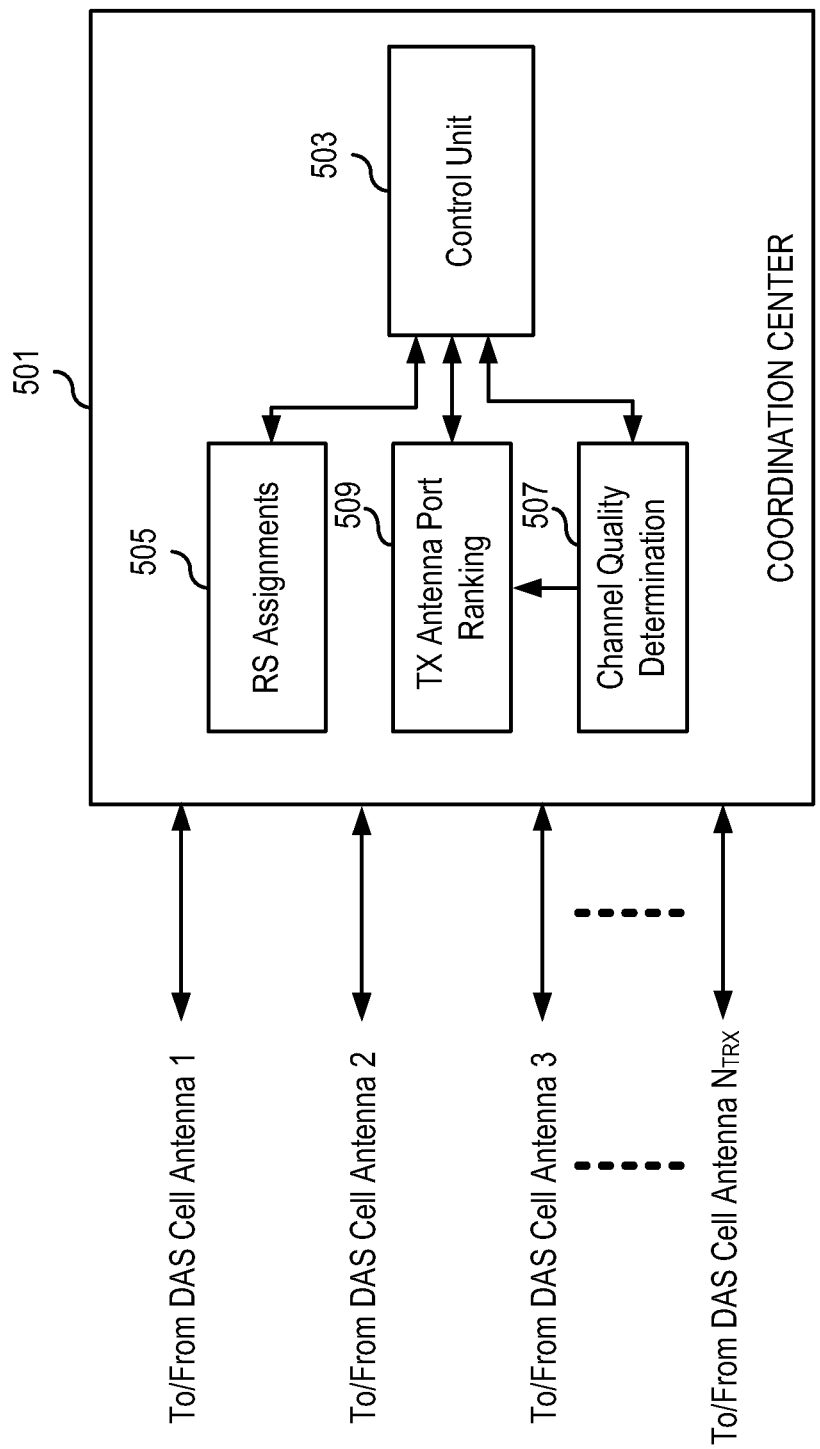
FIG. 5 is a block diagram of an exemplary coordination center capable of carrying out various aspects of the invention.
Figure 6:
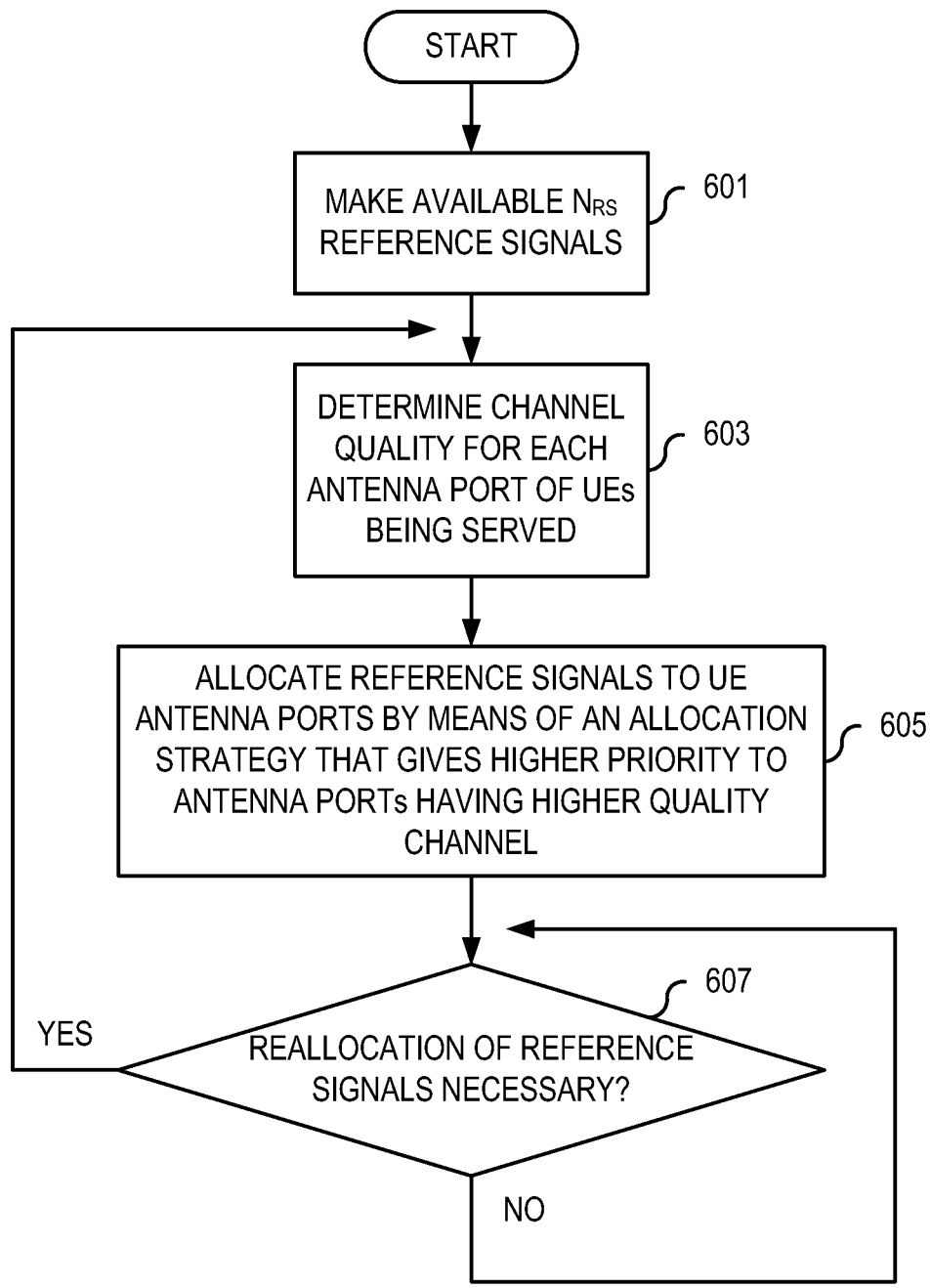
FIG. 6 is, in one respect, a flow chart of steps/processes/functions, carried out by the exemplary coordination center.

Beginning first with FIGS. 5 and 6, FIG. 5 is a block diagram of an exemplary coordination center 501 capable of carrying out various aspects of the invention. FIG. 6 is, in one respect, a flow chart of steps/processes/functions, carried out by the exemplary coordination center 501. In another respect, FIG. 6 can be considered to depict the various elements of logic configured to carry out the various functions described in FIG. 6 and its supporting text.

The exemplary coordination center 501 is coupled to receive signals from, and send signals to, each of a number, $N_{TRX}$, of antennas situated at various sites within a DAS cell served by the coordination center 501. The coordination center 501 includes a control unit 503 for controlling operations relating to the various functions described herein. In various embodiments, the control unit 503 may be separate from, or alternatively an integral part of, one or more other control units (not shown) that control other functions within the coordination center 501.

The coordination center 501 has a number, $N_{RS}$, orthogonal reference signals available to it (step 601). These may be stored in a table, such as the table of reference signal assignments 505 illustrated in FIG. 5. In order to facilitate other aspects of the invention, the exemplary table of reference signal assignments 505 also stores, within the table, information associated with each of the orthogonal reference signals indicating whether that orthogonal reference signal is available for allocation, and if not, to which antenna port it has been allocated. Of course, in alternative embodiments separate tables may be used to keep track of this information.

The coordination center 501 also includes a channel quality determination unit 507, that is logic configured to ascertain a measure of channel quality for each channel existing between a UE's antenna port ("AP") and the coordination center's own antennas. The control unit 503 operates the channel quality determination unit 507 such that a measure of channel quality is determined for each antenna port of the UE's presently being served by the coordination center 501 (step 603). Any of a number of well-known channel quality measurements can be made. For example, path loss is a useful measurement of quality because it is a slow changing parameter.

The set of channel quality information is made available to the control unit 503, which then allocates reference signals to the UE antenna ports by means of an allocation strategy that gives higher priority to antenna ports having higher quality channels (step 605). (The word "priority" in this description refers to the right to take precedence and/or precede others in obtaining an antenna port allocation.) To facilitate this aspect in the exemplary embodiment, the control unit 503 generates a list of antenna ports ranked according to their corresponding channel quality, and stores this ranking (list) in an antenna port ranking table 509. The generation of a stored list is not essential to the invention, however, and alternative embodiments can be implemented that do not utilize such a table.

Allocation of orthogonal reference signals is made until all of the available orthogonal reference signals have been allocated (i.e., the case in which the number of antenna ports exceeds the available number of orthogonal reference signals), or until each of the UE antenna ports presently being served by the coordination center have been assigned one of the coordination center's orthogonal reference signals.

Conditions within the DAS cell change over time: channel quality changes, some UEs effectively leave the DAS cell (e.g., by physically moving out of the coverage area of the DAS cell or by being turned off), and other UEs effectively enter the DAS cell. Because this is a dynamic situation, the control unit 503 must periodically determine whether a reallocation of reference signals is necessary (decision block 607). If not ("NO" path out of decision block 607), no changes are made. If reallocation is necessary ("YES" path out of decision block 607), then the process is repeated, beginning with the channel quality determination function (step 603).

A number of allocation strategies satisfying the various principles of the invention are possible, and all of these are considered to be embodiments of the invention. It will be appreciated that by basing allocation solely on channel quality, it is possible not only that some UEs will be allocated more orthogonal reference signals for their antenna ports than other UEs having the same or even more antenna ports. Some UEs could even end up having no orthogonal reference signals allocated to them at all.

In some alternative embodiments, it is desired to perform the allocation not only in a way that gives priority to antenna ports having better channel quality than to those that don't, but also in a way that ensures that each UE is allocated at least one orthogonal reference signal. An exemplary embodiment of such a strategy utilizes a round-robin approach to orthogonal reference signal allocation, whereby:

1. The coordination center 501 ranks all of the antenna ports in decreasing order according to their corresponding channel quality.
2. Beginning at the start of the ranking (i.e., with the UE whose antenna port is associated with the best quality channel) and proceeding through to the end of the ranking, the coordination center 501 assigns one of its available (i.e., unassigned) orthogonal reference signals to each of its UEs.
3. If any orthogonal reference signals remain unassigned, the coordination center 501 repeats the process of step 2, starting at the beginning of the ranking and proceeding through to the end of the ranking, and making assignments of orthogonal reference signals to any antenna ports that had not been previously assigned.
4. Step 3 (and by implication, step 2) is repeated until the coordination center 501 has no more orthogonal reference signals available for assignment, or until each of the UE antenna ports being served by the coordination center 501 have been assigned an orthogonal reference signal.

Figure 7A:
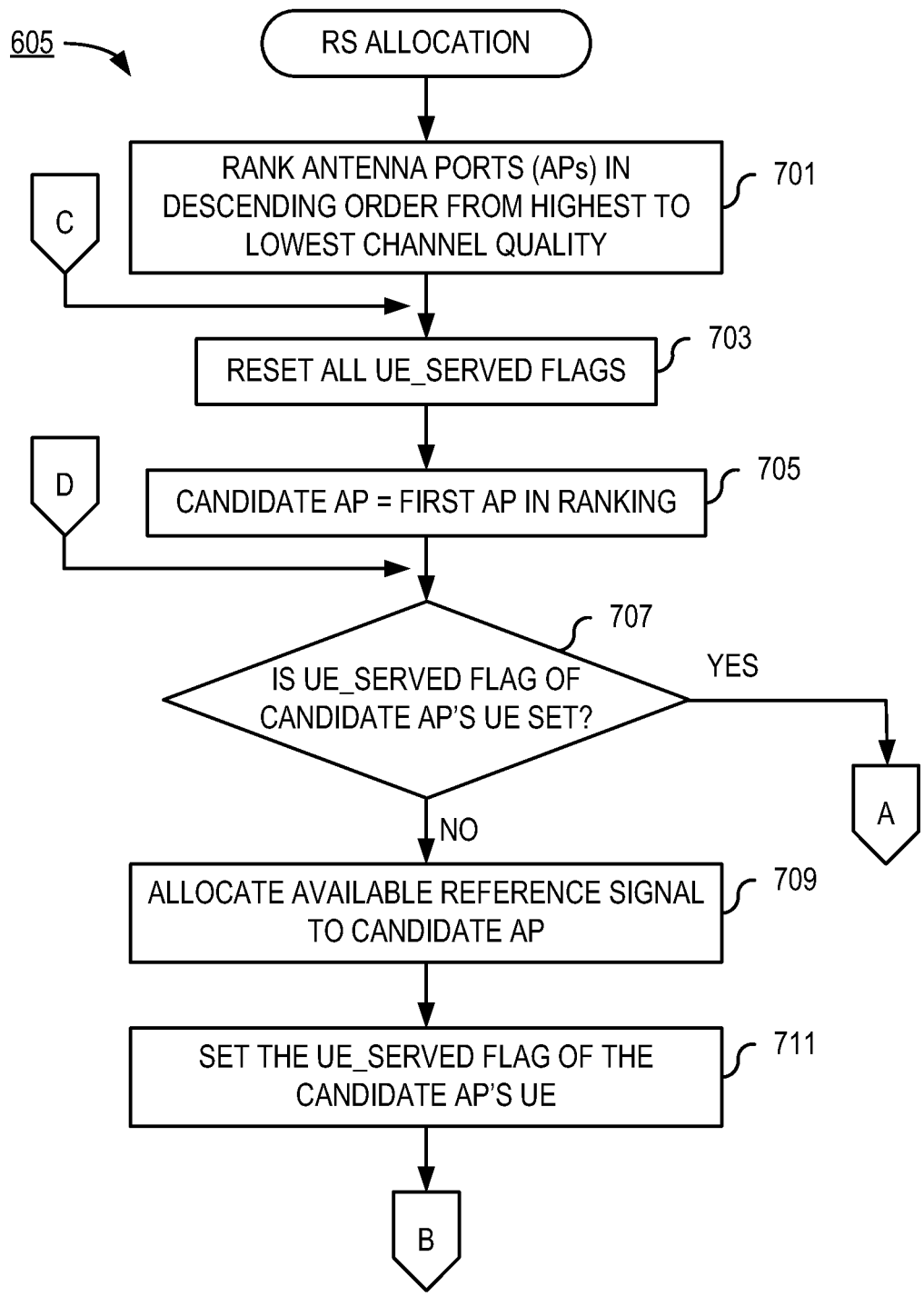
FIGS. 7a and 7b, in one respect, can be considered to depict a flow chart of steps/processes/functions, carried out by the exemplary coordination center 501 as part of allocating reference signals to UE antenna ports by means of an allocation strategy that gives higher priority to antenna ports having a higher quality channel.
Figure 7B:
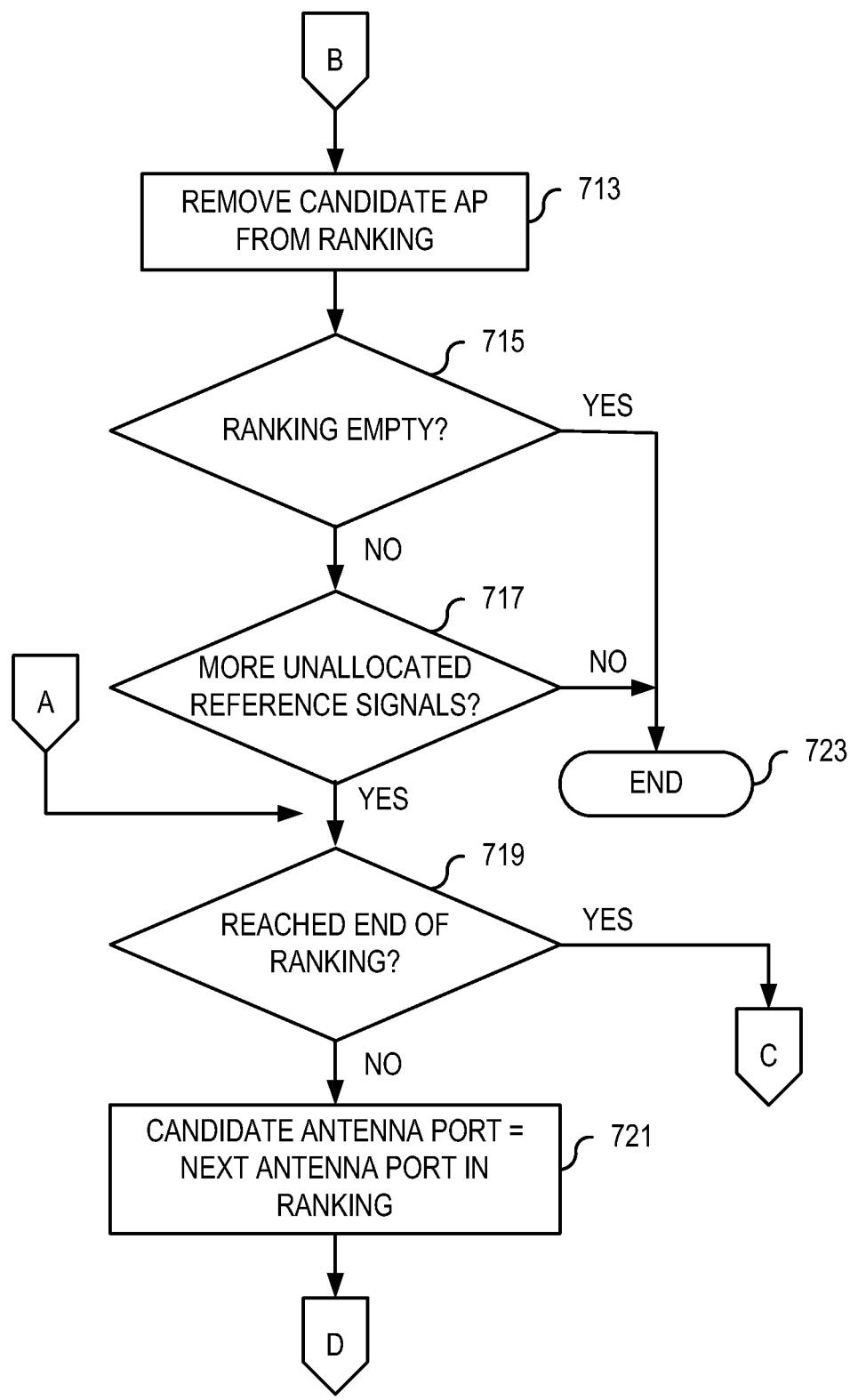

Aspects of this allocation strategy are now further described in connection with an embodiment illustrated by FIGS. 7a and 7b which, in one respect, can be considered to depict a flow chart of exemplary steps/processes/functions, carried out by the exemplary coordination center 501 as part of its performance of step 605. In another respect, FIGS. 7a and 7b can be considered to depict the various elements of logic configured to carry out the various functions described in these figures and their supporting text.

An initial function of the orthogonal reference signal allocation process 605 is to rank antenna ports in descending order from highest to lowest channel quality (step 701). Another initial function is to reset a set of flags, herein referred to as "UE_served" flags (step 703). The UE_served flags are provided in correspondence to the UEs represented in the ranking, one flag per UE. When reset, the UE_served flag permits a UE's antenna port to receive an orthogonal reference signal allocation. When set, the UE_served flag prevents the corresponding UE from receiving any further orthogonal reference signal allocation.

The orthogonal reference signal allocation process 605 repeatedly loops through the ranking, attempting to assign available orthogonal reference signals to UE antenna ports until either there are no more available orthogonal reference signals, or all UE antenna ports have been allocated one of the orthogonal reference signals. The latter is possible whenever the actual number of UE antenna ports present in the DAS cell is less than the maximum number for which it was designed.

To begin the looping process, the first antenna port in the ranking (i.e., the one associated with the highest channel quality) is selected for use as a candidate antenna port (step 705). The UE_served flag of the UE in which the candidate antenna port is located is tested to determine its state (i.e., set or reset) (decision block 707). In the first pass through the loop, it will not be for this highest ranking antenna port ("NO" path out of decision block 707), and one of the available orthogonal reference signals is allocated to this candidate antenna port (step 709).

In order to prevent any other antenna ports of the same UE from receiving an allocation during this same pass through the allocation loop, the UE's UE_served flag is set (step 711). Also, to prevent the candidate antenna port from being allocated another orthogonal reference signal during a subsequent pass through the allocation loop, it is removed from the ranking (step 713). Alternative ways of handling this include providing another flag for each antenna port, indicating whether it has received an orthogonal reference signal allocation. Such a flag would then have to be tested prior to making any allocation to an antenna port.

Next, the ranking is tested to determine whether it is empty (decision block 715). This is possible because, as just explained, antenna ports are removed from the ranking once they have received an orthogonal reference signal assignment. If the ranking is empty ("YES" path out of decision block 715), the allocation is complete and the process exits (step 723).

However, if the ranking is not empty ("NO" path out of decision block 715) it means that more antenna ports are eligible to receive an orthogonal reference signal assignment. Thus, it is further tested whether there exist any more unallocated reference signals (decision block 717). If not ("NO" path out of decision block 717), no further allocations are possible and the process exits (step 723).

If there remain unallocated orthogonal reference signals ("YES" path out of decision block 717) a further test is performed to determine whether this pass through the loop has reached the end of the ranking (decision block 719). If it has ("YES" path out of decision block 719), loop processing repeats, starting at the beginning of the ranking In order to permit second (and in subsequent passes of the loop, third, fourth, etc.) antenna ports of UEs to receive an orthogonal reference signal allocation, all of the UE_served flags are again reset (step 703) and the candidate antenna port is selected as the first antenna port remaining in the ranking (step 705). Processing then continues as described above.

Returning to a discussion of decision block 719, if loop processing had not reached the end of the ranking ("NO" path out of decision block 719), a candidate antenna port is selected as the next antenna port in the ranking (step 721). Processing then repeats beginning at the test to determine whether the UE_served flag of the (new) candidate antenna port's UE has been set (decision block 707). It will be appreciated that this is now possible if the candidate antenna port is located in the same UE as the previous candidate antenna port. If the UE_served flag of the candidate antenna port's UE has been set ("YES" path out of decision block 707), the candidate antenna port cannot be further considered until other antenna ports included in other UEs have first been given a chance. Accordingly, processing skips down to the test to determine whether the end of the ranking has been reached (decision block 719). Processing then continues as earlier described.

The above and equivalent allocation arrangements guarantee that each UE receives at least one orthogonal reference signal (and one stream). Furthermore, UEs with better channel quality are eligible to have more orthogonal reference signals (and more streams) assigned than UEs with poorer channel quality.

Figure 8:
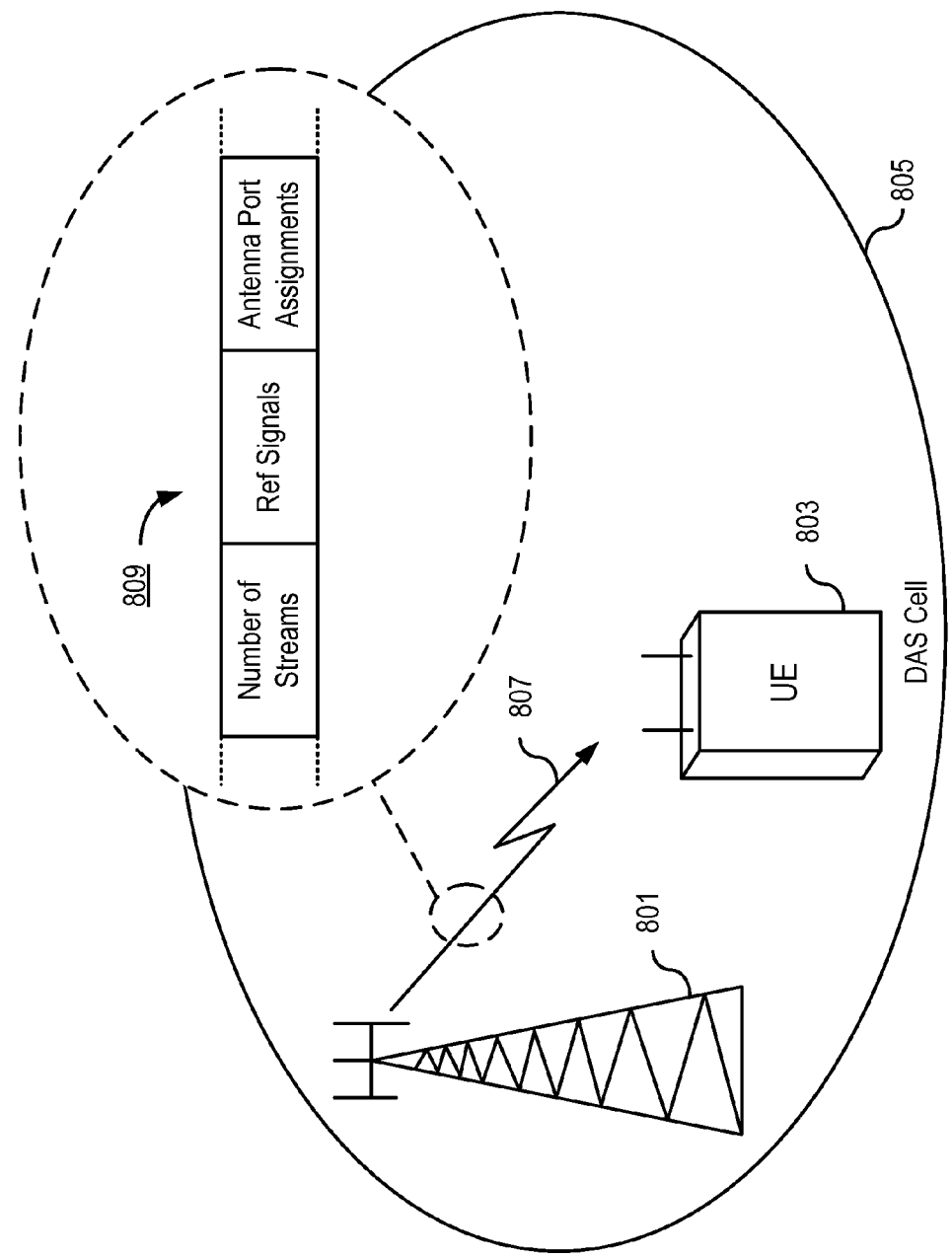
FIG. 8 is a block diagram illustrating a control communication from a coordination center to a UE located in the coordination center's DAS cell, wherein control information related to reference signal allocations is included as part of the control signaling.

In another aspect of embodiments consistent with the invention, once a coordination center has decided how many reference signals should be assigned to each UE (and from which of that UE's antenna ports the reference signals should be transmitted), this information should be communicated to the UE. This can be done in any number of ways. For example, FIG. 8 is a block diagram illustrating a communication from a coordination center 801 to a UE 830 located in the coordination center's DAS cell 805. In the example, the communication takes place by means of dedicated control channel 807 on the downlink, although other signaling mechanisms can be used instead. Control information 809 is included as part of this signaling. The control information 809 includes, but is not limited to, for example, any of the following: the number of streams that the UE 803 is to transmit; the particular reference signals to be used for each of the streams; and which of the UE's antenna ports is to use which reference signal. As the reference signal assignments are dynamic in nature, the UE 803 cannot expect to use these for the duration of its connection in this DAS cell 805. Rather, the UE 803 can be expressly or inherently (e.g., by means of internal design) instructed to utilize these assignments for a given duration of time, a given number of frames, or equivalent.

It will be observed that the particular chronological ordering of information illustrated in FIG. 8 is merely for purposes of example, and is not essential to the invention. The invention is considered to be embodied in any type of ordering and/or or encoding of this information.

It will also be appreciated that the various information elements included in the control information 809 can be encoded in any of a number of ways. For example, reference signals can be directly included, "as is", in the control information 809. Alternatively, each of the reference signals can be uniquely associated with one of a number of codes, in which case it is sufficient to include the corresponding code number in the control information 809. Upon receipt, the UE 803 is able to convert the received code number into the actual reference signal associated with that code number (e.g., by means of a pre-stored lookup table). Other information elements in the control information 809 can similarly be indicated by means of any of a number of possible encoding schemes, no one of which is essential to the invention.

An advantage of various embodiments consistent with the invention is that coordination centers/base stations of mobile communication systems do not have to be provided with enough orthogonal reference signals to permit an allocation to every antenna port in every possible UE that the coordination center/base station can serve. This, in turn, reduces the overhead associated with reference signals on the uplink in such systems.

The invention has been described with reference to particular embodiments. However, it will be readily apparent to those skilled in the art that it is possible to embody the invention in specific forms other than those of the embodiment described above.

For example, the various aspects of the invention have been described in connection with embodiments utilizing DAS techniques. However, the principles illustrated by these exemplary embodiments are also applicable to traditional cell arrangements, in which a single base station (or equivalent) is associated with only single transmit/receive antenna.

Thus, the described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating a network node that serves a plurality of user equipments in a mobile communication system, the method comprising:

providing the network node with a number, $N_{RS}$, of orthogonal reference signals for uplink signal transmissions, wherein $N_{RS}$ is less than a maximum number, $N_{MAX\_AP}$, of user equipment antenna ports that can be served by the network node; and for each of the antenna ports, ascertaining a channel quality of a channel between the antenna port and the network node;

whenever a number of antenna ports of user equipments being served by the network node exceeds the number, $N_{RS}$, of orthogonal reference signals, allocating all $N_{RS}$ orthogonal reference signals to a subset of all of the antenna ports by means of an allocation process such that:

each orthogonal reference signal is allocated to only one of the antenna ports;

each antenna port has no more than one orthogonal reference signal allocated to it; and allocation decisions made by the allocation process are a function of the channel qualities of the respective antenna ports such that the higher the channel quality, the higher priority the corresponding antenna port is given as a candidate for receiving an orthogonal reference signal allocation.

2. The method of claim 1, wherein allocating all $N_{RS}$ orthogonal reference signals to the subset of all of the antenna ports by means of the allocation process is performed such that:

each of the user equipments has at least one antenna port to which an orthogonal reference signal is allocated.

3. The method of claim 1, wherein allocating all $N_{RS}$ orthogonal reference signals to antenna ports by means of an allocation process comprises:

in a round-robin order, allocating one orthogonal reference signal in turn to each of the user equipments still having an antenna port to which no orthogonal reference signal has yet been assigned, wherein the round-robin order begins with a user equipment associated with a best ascertained channel quality and continues with user equipments associated with ascertained channel qualities in descending order.

4. The method of claim 1, wherein each of the user equipments has a same number of antenna ports.

5. The method of claim 1, wherein the network node is an eNodeB.

6. The method of claim 1, wherein the network node is a coordination center of a distributed antenna system cell in the mobile communication system.

7. The method of claim 1, wherein each of the antenna ports corresponds to a single antenna in one of the user equipments.

8. The method of claim 7, wherein each of the user equipments transmits an information stream through no more than one of the user equipment's antennas.

9. The method of claim 1, comprising:

communicating a control signal to a user equipment, wherein the control signal conveys reference signal allocation information.

10. The method of claim 9, wherein the reference signal allocation information includes:

an indicator that uniquely identifies one or more reference signals to be used by the user equipment; and an indicator that associates each of the one or more identified reference signals with a corresponding one of a number antenna ports of the user equipment.

11. An apparatus for controlling a network node that serves a plurality of user equipments in a mobile communication system, the apparatus comprising:

a processor configured to execute logic; and at least one computer readable carrier that stores logic executable by the processor, the computer readable carrier comprising:

logic configured to provide the network node with a number, $N_{RS}$, of orthogonal reference signals for uplink signal transmissions, wherein $N_{RS}$ is less than a maximum number, $N_{MAX\_AP}$, of user equipment antenna ports that can be served by the network node; and logic configured to ascertain, for each of the antenna ports, a channel quality of a channel between the antenna port and the network node;

logic configured to allocate all $N_{RS}$ orthogonal reference signals to a subset of all of the antenna ports by means of an allocation process such that, whenever a number of antenna ports of user equipments being served by the network node exceeds the number, $N_{RS}$, of orthogonal reference signals:

each orthogonal reference signal is allocated to only one of the antenna ports;

each antenna port has no more than one orthogonal reference signal allocated to it; and allocation decisions made by the allocation process are a function of the channel qualities of the respective antenna ports such that the higher the channel quality, the higher priority the corresponding antenna port is given as a candidate for receiving an orthogonal reference signal allocation.

12. The apparatus of claim 11, wherein the logic configured to allocate all $N_{RS}$ orthogonal reference signals to the subset of all of the antenna ports by means of the allocation process operates such that:

each of the user equipments has at least one antenna port to which an orthogonal reference signal is allocated.

13. The apparatus of claim 11, wherein the logic configured to allocate all $N_{RS}$ orthogonal reference signals to antenna ports by means of an allocation process comprises:

logic configured to allocate, in a round-robin order, one orthogonal reference signal in turn to each of the user equipments still having an antenna port to which no orthogonal reference signal has yet been assigned, wherein the round-robin order begins with a user equipment associated with a best ascertained channel quality and continues with user equipments associated with ascertained channel qualities in descending order.

14. The apparatus of claim 11, wherein each of the user equipments has a same number of antenna ports.

15. The apparatus of claim 11, wherein the network node is an eNodeB.

16. The apparatus of claim 11, wherein the network node is a coordination center of a distributed antenna system cell in the mobile communication system.

17. The apparatus of claim 11, wherein each of the antenna ports corresponds to a single antenna in one of the user equipments.

18. The apparatus of claim 17, wherein each of the user equipments transmits an information stream through no more than one of the user equipment's antennas.

19. The apparatus of claim 11, comprising:

logic configured to communicate a control signal to a user equipment, wherein the control signal conveys reference signal allocation information.

20. The apparatus of claim 19, wherein the reference signal allocation information includes:

an indicator that uniquely identifies one or more reference signals to be used by the user equipment; and an indicator that associates each of the one or more identified reference signals with a corresponding one of a number antenna ports of the user equipment.

* * * * *

UNITED STATES PATENT AND TRADEMARK OFFICE
CERTIFICATE OF CORRECTION

PATENT NO. : 8,451,791 B2
APPLICATION NO. : 13/421403
DATED : May 28, 2013
INVENTOR(S) : Zangi It is certified that error appears in the above-identified patent and that said Letters Patent is hereby corrected as shown below:

In the Specification

In Column 9, Line 31, delete "ranking" and insert -- ranking. --, therefor.

Signed and Sealed this
Eighth Day of October, 2013

Teresa Stanek Rea
*Deputy Director of the United States Patent and Trademark Office*